United States Patent
Abbott, Jr. et al.

(10) Patent No.: US 11,260,556 B2
(45) Date of Patent: Mar. 1, 2022

(54) ADDITIVE MANUFACTURING IN AN ATMOSPHERE INCLUDING OXYGEN

(71) Applicant: Hewlett-Packard Development Company, L.P., Houston, TX (US)

(72) Inventors: James Elmer Abbott, Jr., Corvallis, OR (US); Vladek Kasperchik, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 120 days.

(21) Appl. No.: 16/098,073

(22) PCT Filed: Jul. 20, 2016

(86) PCT No.: PCT/US2016/043176
§ 371 (c)(1),
(2) Date: Oct. 31, 2018

(87) PCT Pub. No.: WO2018/017079
PCT Pub. Date: Jan. 25, 2018

(65) Prior Publication Data
US 2019/0143559 A1    May 16, 2019

(51) Int. Cl.
*B29C 64/165*    (2017.01)
*B29C 64/129*    (2017.01)
(Continued)

(52) U.S. Cl.
CPC ............ *B28B 1/001* (2013.01); *B29C 64/129* (2017.08); *B29C 64/165* (2017.08); *B33Y 10/00* (2014.12);
(Continued)

(58) Field of Classification Search
CPC .............................. B33Y 70/00; B29C 64/165
See application file for complete search history.

(56) References Cited

U.S. PATENT DOCUMENTS 5,204,055 A * 4/1993 Sachs ..................... B28B 1/001
                                                                        419/2
5,285,040 A * 2/1994 Brandberg ......... B65D 81/3446
                                                                      219/745
(Continued)

FOREIGN PATENT DOCUMENTS

CN    104529474 A    5/2015
WO   WO-2015065510 A1    5/2015
(Continued)

OTHER PUBLICATIONS

"Surfactant." Wikipedia, the Free Encyclopedia, Jun. 26, 2016, web.archive.org/web/20160627225652/en.wikipedia.org/wiki/Surfactant. (Year: 2016).*
(Continued)

*Primary Examiner* — Alison L Hindenlang
*Assistant Examiner* — Andrés E. Behrens, Jr.
(74) *Attorney, Agent, or Firm* — HPI Patent Department (57) ABSTRACT

A method for additive manufacturing includes: forming a three-dimensional object by: depositing a layer of a powdered build material onto a surface; selectively depositing a liquid comprising a susceptor onto the layer of the powdered build material in a pattern; and heating the object by electromagnetic radiation with a microwave or radio wave frequency, in an atmosphere including oxygen, to a temperature sufficient to sinter the powdered build material.

12 Claims, 5 Drawing Sheets

(51) Int. Cl.
| | |
|---|---|
| *B33Y 70/00* | (2020.01) |
| *B33Y 10/00* | (2015.01) |
| *B28B 1/00* | (2006.01) |
| B29C 64/364 | (2017.01) |
| B29C 64/124 | (2017.01) |
| B33Y 70/10 | (2020.01) |
| B29C 35/08 | (2006.01) |

(52) U.S. Cl.
CPC ...... *B33Y 70/00* (2014.12); *B29C 2035/0855* (2013.01); *B29C 2035/0861* (2013.01)

(56) References Cited

U.S. PATENT DOCUMENTS

| | | | | |
|---|---|---|---|---|
| 5,368,199 | A * | 11/1994 | Haas | B05C 17/00546 219/679 |
| 7,708,929 | B2 * | 5/2010 | Monsheimer | B29C 64/153 264/460 |
| 7,795,349 | B2 | 9/2010 | Bredt et al. | |
| 10,392,512 | B2 * | 8/2019 | Emamjomeh | B33Y 10/00 |
| 2004/0232583 | A1 * | 11/2004 | Monsheimer | B29C 64/165 264/113 |
| 2013/0170171 | A1 * | 7/2013 | Wicker | H01L 21/4846 361/809 |
| 2014/0073065 | A1 * | 3/2014 | Ohno | H05B 6/68 438/5 |
| 2014/0238250 | A1 * | 8/2014 | Gephart | H05B 6/6491 99/483 |
| 2015/0054204 | A1 | 2/2015 | Tsellakhovich et al. | |
| 2015/0080495 | A1 * | 3/2015 | Heikkila | B28B 1/001 523/223 |
| 2015/0343704 | A1 * | 12/2015 | Stahl | B29C 64/112 264/401 |
| 2015/0360463 | A1 | 12/2015 | Sadwick et al. | |
| 2018/0265417 | A1 * | 9/2018 | Champion | C04B 35/62815 |

FOREIGN PATENT DOCUMENTS

| | | | | |
|---|---|---|---|---|
| WO | WO-2015100086 | | 7/2015 | |
| WO | WO-2016118151 | A1 * | 7/2016 | ....... C04B 35/62813 |
| WO | WO-2016175817 | A1 * | 11/2016 | .............. B22F 10/36 |

OTHER PUBLICATIONS

"Dispersant." Wikipedia, the Free Encyclopedia, Jun. 17, 2016, web.archive.org/web/20160617035405/en.wikipedia.org/wiki/Dispersant. (Year: 2016).*

"Carbon Black." Wikipedia, the Free Encyclopedia, Jun. 24, 2016, web.archive.org/web/20160624041524/en.wikipedia.org/wiki/Carbon_black. (Year: 2016).*

Lühken, Arnim. "Energy Input from Microwaves and Ultrasound—Examples of New Approaches to Green Chemistry." Semantic Scholar, Aug. 10, 2013, www.scheikundeinbedrijf.nl/content/Modules/Modulenaam/Files/microwaves.pdf. (Year: 2013).*

Hill, Adrian. "Understanding the Links Between Rheology and Particle Parameters." American Laboratory, Jun. 18, 2013, www.americanlaboratory.com/913-Technical-Articles/35729-Understanding-the-Links-Between-Rheology-and-Particle-Parameters/. (Year: 2013).*

Tallon, Carolina, et al. "Effect of Particle Size on the Shaping of Ceramics by Slip Casting." Journal of the European Ceramic Society, vol. 30, No. 14, 2010, pp. 2819-2826., doi:10.1016/j.jeurceramsoc.2010.03.019. (Year: 2010).*

"Sintering." Wikipedia, Wikimedia Foundation, Jun. 30, 2016, web.archive.org/web/20160630124952/en.wikipedia.org/wiki/Sintering. (Year: 2016).*

Bishop, Dr. Charles A. "Oxidation of Aluminium ." CAB Consultanton Vacuum Deposition Technology , Jan. 23, 2013, web.archive.org/web/20130123172354/www.cabuk1.co.uk/FAQ%207%20Oxidation%20of%20aluminium.pdf. (Year: 2013).*

"Graphite." Wikipedia, Wikimedia Foundation, Jun. 17, 2016, web.archive.org/web/20160617123318/en.wikipedia.org/wiki/Graphite. (Year: 2016).*

"Surfactant." Wikipedia, Wikimedia Foundation, Jun. 27, 2016, web.archive.org/web/20160627225652/en.wikipedia.org/wiki/Surfactant#Dynamics_of_surfactants_at_interfaces. (Year: 2016).*

American Elements. "Copper(I) Oxide." American Elements, Apr. 22, 2016, web.archive.org/web/20160422105958/www.americanelements.com/copper-i-oxide-1317-39-1. (Year: 2016).*

Luo, Xiaowei. "Research of Oxidation Properties of Graphite." Department of Energy, OSTI, 2006, www.osti.gov/etdeweb/servlets/purl/21544872. (Year: 2006).*

* cited by examiner

ADDITIVE MANUFACTURING IN AN ATMOSPHERE INCLUDING OXYGEN

BACKGROUND

An additive manufacturing device is used to produce a three-dimensional object. The additive manufacturing device produces the three-dimensional object by depositing layers of build material corresponding to slices of a computer-aided design (CAD) model that represents the three-dimensional object. Some additive manufacturing machines are referred to as three-dimensional printing devices because they use types of printing technology to deposit some of the manufacturing materials.

BRIEF DESCRIPTION OF THE DRAWINGS

The accompanying drawings illustrate various examples of the principles described herein and are a part of the specification. The illustrated examples are given merely for illustration, and do not limit the scope of the claims.

DETAILED DESCRIPTION

As mentioned above, an additive manufacturing device produces a three-dimensional object from a computer-aided design (CAD) model representing the three-dimensional object. Once the CAD model of the 3D model is created, the CAD model is processed into a number of slices. Each of the slices corresponds to a layer of the three-dimensional object to be produced by the additive manufacturing device. The additive manufacturing device produces a portion of the three-dimensional object by depositing a first layer of build material representing the first slice of the CAD model. The additive manufacturing device then produces subsequent portions of the three-dimensional object by depositing subsequent layers of the build material representing subsequent slices of the CAD model on top of the previous layer until the three-dimensional object is produced.

Some current additive manufacturing devices perform sintering by electromagnetic irradiation in the microwave or radio frequency spectrum. The heat is transferred to the object during heating by incorporating a susceptor into the object. However, susceptors currently used in additive manufacturing devices react with oxygen at elevated temperatures, so sintering by electromagnetic radiation is performed in an oxygen-free environment. Sintering in an atmosphere that contains oxygen would allow a broader range of objects to be produced in a cost-effective manner by additive manufacturing.

A method for additive manufacturing includes forming a three-dimensional object by depositing a layer of a powdered build material onto a surface, selectively depositing a liquid including a susceptor onto the layer of the powdered build material in a pattern, and heating the object by electromagnetic radiation with a microwave or radio wave frequency, in an atmosphere including oxygen, to a temperature sufficient to sinter the powdered build material.

An additive manufacturing method for preparing a three-dimensional ceramic object includes forming a three dimensional object by depositing a layer of a powdered ceramic build material onto a surface, selectively depositing a binder fluid comprising at least one semiconducting metal oxide susceptor particle onto the layer of powdered ceramic build material in a pattern, and heating the object by microwave radiation in an atmosphere including oxygen to sinter the powdered ceramic build material.

A liquid composition for use as a binder fluid in additive manufacturing includes a number of susceptors including a semiconducting metal oxide particle, and a number of sintering aids, wherein the number of susceptors and the number of sintering aids are held in a stable dispersion.

According to an example, the layers are assembled by first depositing a build material to be solidified. The build material may be provided as a powder, a slurry, or as granules of varying sizes. The layer of build material is deposited evenly so as to provide an even thickness to each layer of the final product. The layer of build material is deposited to the surface. A liquid is then deposited over the layer of build material to the portions of the build material so that the pattern produced corresponds to the appropriate slice of the object being prepared. The liquid solidifies, and holds the build material in place where the liquid was deposited. Where the liquid was not deposited, the build material remains free flowing. The solidification of the liquid may occur by any appropriate method, such as by light, heat, evaporation of a volatile liquid, electromagnetic radiation, or any other suitable method. According to one example, the solidification of the liquid occurs at the same time as sintering. In another example, the solidification of the liquid produces a green body that may then be added to by providing an additional layer, or may then be sintered.

In some examples, sintering involves exposing an object to high temperatures. For example, sintering some types of ceramic objects includes heating to temperatures in excess of 1000 degrees Celsius, or even 2000 degrees Celsius. In another example, some types of polymers are sintered at temperatures approaching 300 degrees Celsius. Sintering at elevated temperatures is used in order to prepare objects that are more durable, withstand higher operating temperatures, and provide other such benefits.

Generating the high temperatures to sinter an object may be slow or expensive. Ovens and kilns often need significant time to reach temperatures sufficient to sinter a ceramic object. Laser-based sintering uses an expensive apparatus. In some examples, microwaves have been used to heat an object to sintering temperatures.

In some examples, a powdered build material does not absorb microwave radiation. To increase the efficiency of microwave heating, some examples incorporate susceptors into the object. Including a susceptor in a liquid allows selective sintering of the pattern formed by the liquid, so that build material that did not receive a liquid may be reused.

According to one example, a susceptor is incorporated into an object, and the object is heated using microwave radiation under an inert gas. In this example, the inert gas is used in order to prevent a reaction between the susceptor and oxygen in air that can occur upon heating, but before the object is sintered, such as at 500 degrees Celsius.

Some types of susceptors may negatively impact the mechanical and structural properties of the object if the susceptors remain in the object. For example, carbon black is a very efficient susceptor; however, removal of the carbon black during sintering provides an object that has improved structural and mechanical properties. In another example, carbon black negatively impacts the mechanical and structural properties of the object by accumulating in a boundary space, which decreases the adhesion achieved during sintering.

Microwave and radio frequency radiation to sinter objects prepared by additive manufacturing could be made less expensive and more efficient if the electromagnetic irradiation could take place in at atmosphere including oxygen. Sintering in an atmosphere including oxygen, such as air, would allow a broader range of objects to be produced in a cost-effective manner by additive manufacturing.

In one example, a build material is used to prepare an object by additive manufacturing. A fluid is applied that reacts with the surface of the build material to solidify the object, such as by polymerization of elements within the fluid around the build material particles. The build materials may be metals, minerals, or ceramic oxides, and may be chosen to react with the fluid to readily solidify the object when the fluid contacts the build material. Heat may be used to aid the solidification process. In such an example, the object is prepared by solidification through chemical reaction, rather than by sintering of the build material particles.

In another example, an object is prepared by additive manufacturing, and sintered by microwave irradiation. The microwave irradiation is directed to a specific portion of the object, in order to prepare an object that includes more than one build material which sinter at different temperatures. By directing the microwave irradiation to a part of the object, sintering may be localized to a particular region of the object. However, the ability to perform such an operation in an atmosphere including oxygen would simplify the process of production of objects by additive manufacturing, and may also make production of three-dimensional ceramic objects more cost efficient.

In a further example, an object is prepared in a vacuum, which includes a metal that has been liquefied. In such an example, a ceramic object is prepared and a reaction between a susceptor and oxygen in air is prevented by the vacuum. However, a vacuum may contain residual oxygen, and may not entirely prevent the reaction between oxygen and the susceptor. Additionally, a vacuum may be more expensive to create and maintain than a blanket of an inert gas.

Thus, the present specification provides the ability to prepare three-dimensional objects by additive manufacturing, which are sintered by microwave or radio frequency electromagnetic radiation in an atmosphere including oxygen. Sintering in an atmosphere including oxygen, such as air, decreases the cost of production for additive manufacturing of high-quality objects that are sintered at high temperatures.

Sintering in an atmosphere that includes oxygen may also be an efficient way to remove some types of susceptors that negatively impact the structural and mechanical properties of the object, by allowing the susceptors to be removed by a reaction with oxygen at elevated temperatures. Thus, the present specification provides the ability to produce three-dimensional printed objects with improved structural and mechanical properties.

However, it is contemplated that the devices and methods disclosed herein may be useful in addressing other matters and deficiencies in a number of technical areas. Therefore, the systems and methods disclosed herein should not be construed as addressing any of the particular matters.

In the present specification and the appended claims, "radio frequency" electromagnetic radiation refers to electromagnetic radiation with a frequency of 3 kilohertz (kHz) to 300 GHz, corresponding to a wavelength ranging from 0.10 cm to 100 kilometers (km).

In the present specification and the appended claims, "microwave frequency" electromagnetic radiation refers to electromagnetic radiation with a frequency of 300 megahertz (MHz) to 300 gigahertz (GHz), corresponding to a wavelength ranging from 0.10 centimeter (cm) to 100 cm. It may be noted that according to the present specification, microwave frequency electromagnetic radiation is a type of radio frequency electromagnetic radiation.

In the present specification and the appended claims, "allotropes" of an element or a compound refer to different structural arrangements of the element or compound. For example, allotropes of carbon include diamond, graphite, graphene, fullerenes, carbon nanotubes, and amorphous carbon. Some allotropes of carbon are capable of conducting electricity, while other allotropes of carbon do not conduct electricity.

In the present specification and the appended claims, "sintering" means heating an object to a temperature sufficient to cause the build material particles and solid materials in the liquid to coalesce. Sintering may include heating to a temperature at or near a glass transition temperature of a build material or a solid material in the liquid.

In the present specification and the appended claims, a "green body" refers to an object that has been fully formed, but has not yet been sintered. In an example, a green body prepared by additive manufacturing contains residual liquid from the additive manufacturing process; accordingly, a green body may be a solid, stable object that may be further strengthened and solidified by heating.

In the present specification and the appended claims, a "susceptor" refers to an agent that absorbs electromagnetic energy and releases the energy in the form of heat. A susceptor may be a substance that is capable of absorbing electromagnetic energy and releasing the energy in the form of heat.

Further, as used in the present specification and in the appended claims, the term "a number of" or similar language is meant to be understood broadly as any positive number greater than or equal to 1.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language provides that a particular feature, structure, or characteristic described in connection with that example is included as described, but may not be included in other examples.

Figure 1:
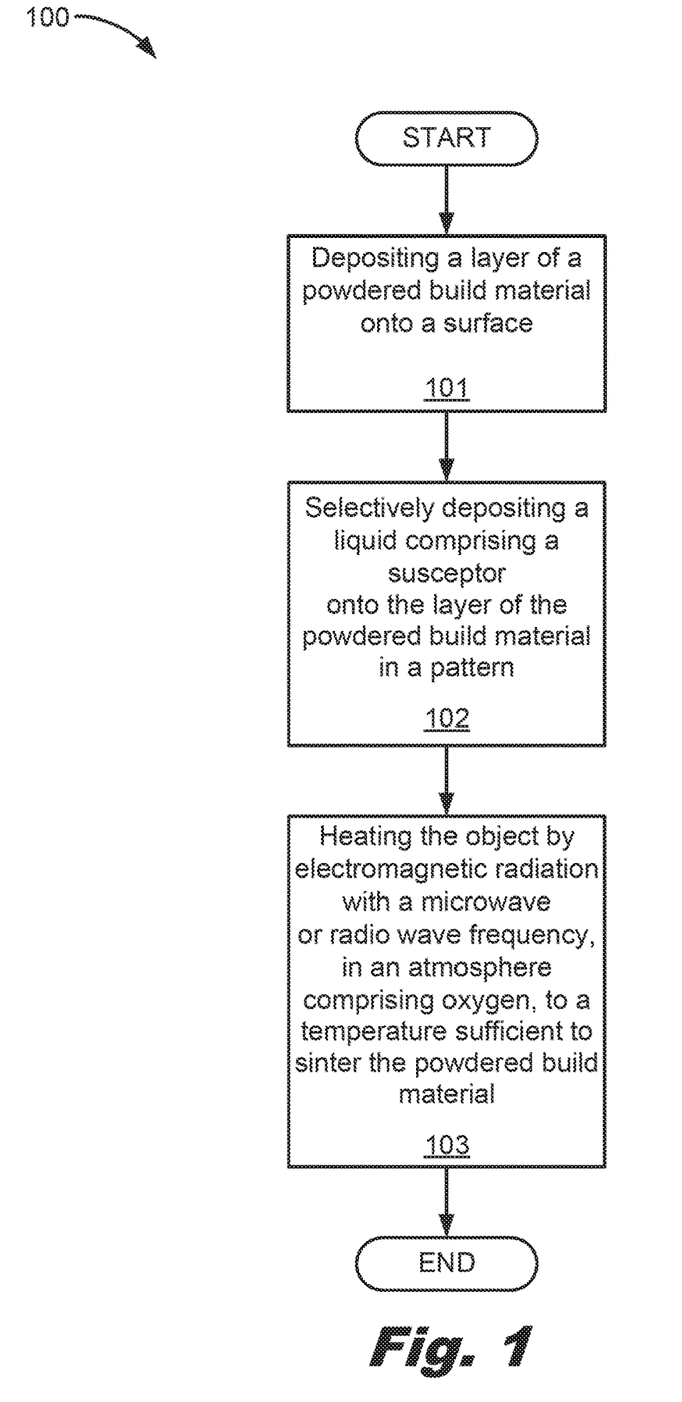
FIG. 1 is a flowchart of an example method for additive manufacturing to produce an object with heating by electromagnetic radiation in an atmosphere including oxygen, consistent with the disclosed implementations.

Turning now to the figures, FIG. 1 is a flowchart of a method for an additive manufacturing process to produce a three-dimensional object with heating by electromagnetic radiation in an atmosphere including oxygen. The method (100) includes depositing (101) a layer of a powdered build material onto a surface, and selectively depositing (102) a liquid including a susceptor onto the layer of the powdered build material in a pattern, and heating (103) the object by electromagnetic radiation with a microwave or radio wave frequency, in an atmosphere including oxygen, to a temperature sufficient to sinter the powdered build material.

As mentioned above, the method (100) includes depositing (101) a layer of a powdered build material onto a surface. The surface onto which a layer of powdered build material is deposited includes any appropriate surface. This includes a surface within an additive manufacturing device or a layer that has previously been deposited in the formation of the object. A three-dimensional object produced by the method (100) includes a number of layers. For example, the three-dimensional object includes a single layer. In another example, the three-dimensional object includes twenty-five layers. In a further example, the three-dimensional object includes 5,000 layers or more.

Various types of build material may be deposited (101) as a layer onto a surface. In one example, the build material is a fusible material. A fusible material fuses together at elevated temperatures to form a solid body. Non-limiting examples of fusible materials include materials with a glass transition temperature of at least 150 degrees C., 500 degrees C., 1400 degrees C., or even 1800 degrees C.

The powdered build material that is deposited (101) as a layer onto a surface may also be a polymer. In one example, a homopolymer is used as a powdered build material. In another example, a copolymer is used as a powdered build material. In a further example, a polymeric build material is used as a composite with another compound, such as glass, ceramic or carbon. For example, a powdered build material is provided by either a ceramic composite of a homopolymer or copolymer. Non-limiting examples of suitable polymers which may be used as homopolymers, copolymers, or composites include polyimides (PI), polyamide-imides (PAI), nylons, polyvinyl chlorides (PVC), polycarbonates (PC), high-density polyethylenes (HDPE), fluorinated polyethylenes, polypropylenes (PP), fluorinated polypropylenes, polyaryletherketones (PAEK), polybenzimidazoles (PBI), acrylonitrile-butadiene-styrene (ABS), and combinations thereof.

In another example, the build material may be a ceramic material. Ceramics are inorganic, solid materials. Non-limiting examples of suitable ceramic materials include aluminum oxide ($Al_2O_3$), yttrium oxide ($Y_2O_3$), beryllium oxide (BeO), cerium oxide ($CeO_2$), zirconium oxide ($ZrO_2$), silicon nitride ($Si_3N_4$), boron nitride (BN), aluminum nitride (AlN), aluminum titanate ($Al_2TiO_5$), barium titanate (BaTiO$_3$), spinel ($MgO.Al_2O_3$), silica ($SiO_2$), magnesia (MgO), fluorite ($CaF_2$), lithium fluoride (LiF), titanium dioxide ($TiO_2$), hydroxyapatite, calcium oxide, and combinations thereof. Generally, the preferred build materials have a dielectric loss tangent that is less than 0.01 for the wavelength of interest. This is a representative list and is not exhaustive of all possible build materials.

In a further example, the build material is a dielectric material. Suitable dielectric materials include those that have low polarizability in an electric field. Non-limiting examples of suitable dielectric materials include aluminum oxide ($Al_2O_3$), diatomaceous earth, borosilicate, quartz, magnesia (MgO), zirconium silicate ($ZrSiO_4$), and combinations thereof.

The classification of a build material as one type of material is not mutually exclusive with classification as another type of material. For example, aluminum oxide may be both a ceramic material and a dielectric material.

A powdered build material is chosen so as to be suitable for the application for which it is used. According to one example, aluminum oxide is used as the powdered build material to produce a ceramic object efficiently and at low cost. In another example, zirconium oxide is used as the powdered build material to produce a ceramic object with high resistance to crack propagation. In a further example, a combination of build materials is used, involving a blend or spatial separation of the different build materials to certain parts of an object.

According to one example, a build material is provided as a powder. According to another example, a build material is provided as a slurry. A suitable build material includes particles, which are preferably free flowing. Free flowing build material particles may have any suitable size, such as from 10 micrometer ($\mu$m) to 500 $\mu$m. In one example, a build material is provided as a powder with a particle size range from 10 $\mu$m to 500 $\mu$m, or from 20 $\mu$m to 500 $\mu$m. In another example, a build material is provided as a powder with a particle size ranging from 10 $\mu$m to 200 $\mu$m, such as from 20 $\mu$m to 100 $\mu$m. According to another example, a build material is provided as a slurry with particle sizes ranging from 10 nanometers (nm) to 10 $\mu$m.

An aspect ratio may be determined for a particle. An aspect ratio is the ratio of the longest diameter of the particle to the shortest diameter of the particle that is orthogonal to the longest diameter of the particle. An aspect ratio close to 1 promotes the free flowing of the particles. According to one example, a build material is provided as a powder with particles with aspect ratios ranging from 1 to 3, such as from 1 to 2. In another example, a build material is provided as a powder with particles with aspect ratios ranging from 1 to 2.5, such as from 1 to 1.5. In a further example, a build material has particles that are approximately spherical, having an aspect ratio from 1 to 1.2.

As mentioned above, the method (100) includes selectively depositing (102) a liquid including a susceptor onto the layer of the powdered build material in a pattern. In some examples, there are portions of a layer of a powdered build material that were not included in the pattern, and thus have not come in contact with a liquid including a susceptor. Build material that has not come in contact with a liquid remains free flowing. When appropriate, build material that has not contacted a liquid may be retained to structurally support the object during heating (103). In another example, build material that has not come in contact with a liquid is removed prior to heating (103).

The liquid that is selectively deposited (102) includes a susceptor. A susceptor absorbs electromagnetic radiation and emits the energy in the form of heat, which is transferred to the surrounding environment, such as the build material particles. In some examples, the ability of a susceptor to absorb electromagnetic radiation and emit the energy as heat is temperature dependent. Some susceptors absorb microwave radiation effectively at an ambient temperature of 20-25 degrees Celsius, while other susceptors begin to absorb electromagnetic radiation effectively at elevated temperatures, such as at 400-600 degrees Celsius. In an example, a susceptor that absorbs electromagnetic radiation at or near ambient temperature is used.

Non-limiting examples of suitable susceptors include electrically conductive, semi-conductive, and polarizable allotropes of carbon, powdered metals, silicon carbide, and semiconducting metal oxides, such as copper(II) oxide, copper(I) oxide, cobalt(II) oxide, iron oxides, ferrites, and combinations thereof. Additional suitable susceptors include carbides and borides of transition metals. According to one example, copper(II) oxide is used as a susceptor. In another example, copper(II) oxide is used as a susceptor in combination with an electrically conductive, semi-conductive, and polarizable allotrope of carbon. Electrically conductive, semi-conductive, and polarizable allotropes of carbon include graphite, graphene, carbon black, and carbon nanotubes. Electrically conductive, semi-conductive, and polarizable allotropes of carbon act as susceptors; some other allotropes of carbon are less effective as susceptors.

Some types of susceptors react with oxygen at elevated temperatures. For example, an electrically conductive, semi-conductive, and polarizable allotrope of carbon may react with oxygen at temperatures of approximately 500 degrees Celsius to produce carbon dioxide and/or carbon monoxide. In some examples, at least two susceptors are included, at least one of which is no longer present in the object after the object has been heated by electromagnetic radiation to a temperature that enables rapid oxidation in an atmosphere including oxygen. In an example, a liquid contains an electrically conductive, semi-conductive, and polarizable allotrope of carbon, as well as copper(II) oxide; sintering at temperatures above 500 degrees Celsius in an atmosphere including oxygen partially or fully removes the electrically conductive, semi-conductive, and polarizable allotrope of carbon from the sintered object. In another example, a reaction between an electrically conductive, semi-conductive, and polarizable allotrope of carbon and oxygen is prevented entirely by using copper(II) oxide as the sole susceptor.

A susceptor, or a combination of susceptors, may be present in a liquid in an amount up to 50% by weight, relative to the total weight of the liquid. For example, a liquid according to the present specification contains from 5% to 45% by weight, such as from 20% to 40% by weight or from 30% to 40% by weight of at least one susceptor, with all weights being relative to the total weight of the liquid. In a further example, a susceptor, or a combination of susceptors, is included in a liquid according to the present specification in an amount of from 0.1% to 10% by weight, such as from 0.5% to 5% by weight, relative to the total weight of the liquid. According to another example, at least one susceptor is included in a liquid in the highest amount that the liquid can support while remaining a stable dispersion of the susceptor, in order to most efficiently sinter the build material during heating.

The liquid that is selectively deposited (102) may also comprise a sintering aid. A sintering aid is a compound that facilitates the fusing of the larger build material particles together, and fills spaces between the build material particles. Upon heating, sintering aid particles mediate the fusing together of the build material particles to sinter the object, and are sintered to and around the build material particles. According to one example, a sintering aid includes particles that are of a similar composition to the build material, and are small enough to fill spaces between the build material particles. In another example, a sintering aid includes particles that have a glass transition or melting temperature below or near the glass transition temperature of the build material particles, and are small enough to fill spaces between the build material particles. Non-limiting examples of suitable sintering aids include the above build materials, such as nanoparticles of silica, nanoparticles of aluminum oxide, and nanoparticles of zirconium oxide. For the purposes of the present specification, a nanoparticle may be a particle with a particle size ranging from 0.1 nanometers (nm) to 100 nm.

A sintering aid, or a combination of sintering aids, may be included in a liquid in an amount of up to 50% by weight, relative to the total weight of the liquid. For example, a sintering aid is included in a liquid an amount of up to 40% by weight, such as up to 30% by weight, relative to the total weight of the liquid. In another example, a sintering aid is included in a liquid in an amount of up to 20% by weight, such as up to 15% by weight, relative to the total weight of the liquid. In a further example, a sintering aid is included in a liquid in an amount ranging from 0.1% to 20% by weight, such as from 0.5% to 10% by weight, or from 1% to 5% by weight, relative to the total weight of the liquid. In a still further example, a liquid contains at least one sintering aid and at least one susceptor in the highest amounts that the liquid can support while remaining a stable dispersion of the sintering aid and susceptor, in order to most efficiently sinter the build material during heating.

In one example, a liquid including a susceptor is a stable dispersion of the susceptor. In another example, a liquid including a susceptor is a stable dispersion of both at least one susceptor and at least one sintering aid. A liquid that is a stable dispersion may be more readily selectively deposited (102) to form an object because a stable dispersion ensures that a droplet of liquid contains the components to drive sintering. Such a stable dispersion may be achieved by providing particles within the liquid, such as susceptor particles, that are sufficiently small, such as, for example, 100 nanometers (nm) or less in diameter. According to another example, a liquid according to the present specification contains a susceptor particle that is 60 nm or less, such as 50 nm or less, or 40 nm or less in diameter. In a further example, a liquid according to the present specification contains a susceptor particle and a sintering aid in particulate form, such that both particles are 50 nm or less, such as 35 nm or less, or 10 nm or less in diameter. The stability of a dispersion is also a function of the density of the particles; a particle density closer to the density of the fluid may be held in a stable dispersion with larger particle sizes. For example, in a fluid with a density near 1 mg/ml, a type of particle with a density of 3 milligrams per milliliter (mg/ml) may be held in a stable dispersion with larger particles than a type of particle with a density of 6 mg/ml.

According to one example, a liquid including a susceptor is dispensed by jetting, such as from an inkjet because of the precision with which inkjets can dispense agents and their flexibility to dispense different types and formulations of liquids. In such an example, the liquid, and the susceptor contained therein, are provided so as to be suitable for such deposition methods. For example, the liquid is able to sustain increased pressure without perturbing the stability of the dispersion; such pressure is achieved by a piezoelectric apparatus, by increased temperature of the ink, or by any other suitable method.

In one example, a single liquid that includes a susceptor is provided. In another example, a plurality of liquids is provided, at least one of which includes a susceptor; for example, a sintering aid may be provided separately, in a liquid separate from the liquid that includes a susceptor.

Following selective deposition (102) of a liquid onto the layer of powdered build material, the object is either be heated (103) in an atmosphere including oxygen, or another layer is deposited. An object is heated (103) to fully or partially sinter the object, or to solidify a layer prior to addition of another layer. An object may be heated (103)

prior to addition of further layers onto the object, or an object may be heated (103) after a number of layers have been deposited. According to one example, an object is heated (103) in an atmosphere including oxygen after each layer is deposited. According to another example, an object is heated (103) in an atmosphere including oxygen after every third layer. According to a further example, an object is heated (103) in an atmosphere including oxygen after the object is fully formed as a green body.

It is also possible according to the method (100) to form each layer individually, or prepare a number of layers together, heat individual layer or group of layers to solidify the layer or group of layers, and then heat (103) the final product to sinter the layers or parts together. This type of assembly may be advantageous if the object is especially large.

In the method (100), heating (103) is performed in an atmosphere including oxygen. In one example, an atmosphere including oxygen is air at atmospheric pressure. In another example, an atmosphere including oxygen is air at a pressure below atmospheric pressure. In a further example, an atmosphere including oxygen is air at a pressure above atmospheric pressure. In a still further example, an atmosphere including oxygen is a mixture of air with at least one other gas, such as nitrogen, hydrogen, argon, oxygen, carbon dioxide, or the like.

In the method (100), heating (103) is performed up to a temperature. For the purposes of the present specification, heating (103) to a temperature means heating (103) such that a portion of an object reaches the specified temperature. Heating (103) by electromagnetic radiation in an atmosphere including oxygen is performed so that a portion of an object reaches any suitable temperature for sintering. For example, heating (103) an object by electromagnetic radiation in an atmosphere including oxygen is performed so that at least a portion of the object reaches a temperature of at least 100 degrees Celsius (C), at least 200 degrees C. at least 250 degrees C., at least 500 degrees C., at least 600 degrees C., at least 750 degrees C., at least 850 degrees C., at least 1000 degrees C., at least 1100 degrees C., at least 1200 degrees C., at least 1300 degrees C., at least 1400 degrees C., at least 1600 degrees C., or at least 2000 degrees C.

Figure 2:
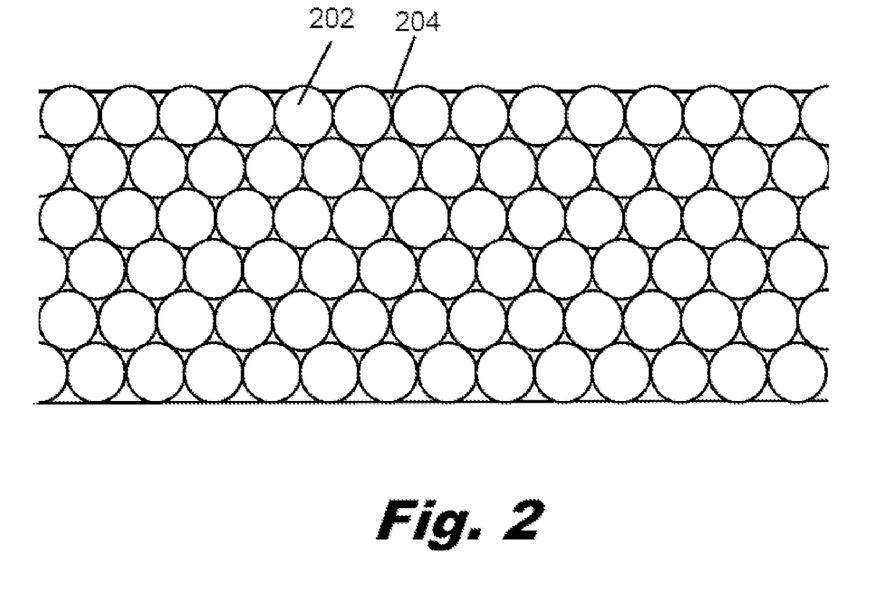
FIG. 2 is a diagram of a powdered build material and a liquid including a susceptor, prior to sintering, consistent with the disclosed implementations.

FIG. 2 illustrates a diagram of a powdered build material and a liquid including a susceptor, prior to sintering, consistent with the disclosed implementations. Accordingly, FIG. 2 illustrates a section of a green body, including of a powdered build material (202) onto which a liquid (204) including a susceptor has been dispensed. Powdered build material (202) particles at the edges of FIG. 2 are partially illustrated, and extend beyond the edges of FIG. 2. The object of FIG. 2 has a thickness of one, two, three, or six layers, corresponding to a layer thickness of six, three, two, or one build material particle (202); a layer may have a thickness that corresponds to a single build material (202) particle, or may have a thickness that corresponds to multiple build material (202) particles.

The build material (202) is as described above, and can be a fusible material, a ceramic material, a dielectric material, or the like.

In FIG. 2, the build material (202) is depicted as spherical particles in hexagonal packing; however, any suitable shape or packing may be present for the build material (202). In an example, the build material (202) includes oblate spheroids, rectangular prisms, or other shapes. The packing of the build material (202) may be consistent and regular, or may be irregular. In another example, a packing is regular in one portion of an object, and irregular in another portion of an object. The packing of the build material (202) particles is a function of the particle shape.

In FIG. 2, the liquid (204) includes a susceptor. Suitable susceptors are described above. The liquid (204) may also include a sintering aid. The liquid (204) also includes such other components as are appropriate for the operability, physical appearance, or storage of the liquid (204). Such materials are known to an individual skilled in the art. In an example, a liquid (204) also includes: a solvent, such as water, an alcohol, a liquid hydrocarbon, a liquid silicone, an oil, or another appropriate solvent; a surfactant, which may assist in supporting a stable dispersion or increase the wettability of the liquid (204) on contact with a build material (202); a dye or pigment to provide a color to the liquid (204) or to the object; and combinations thereof.

Figure 3:
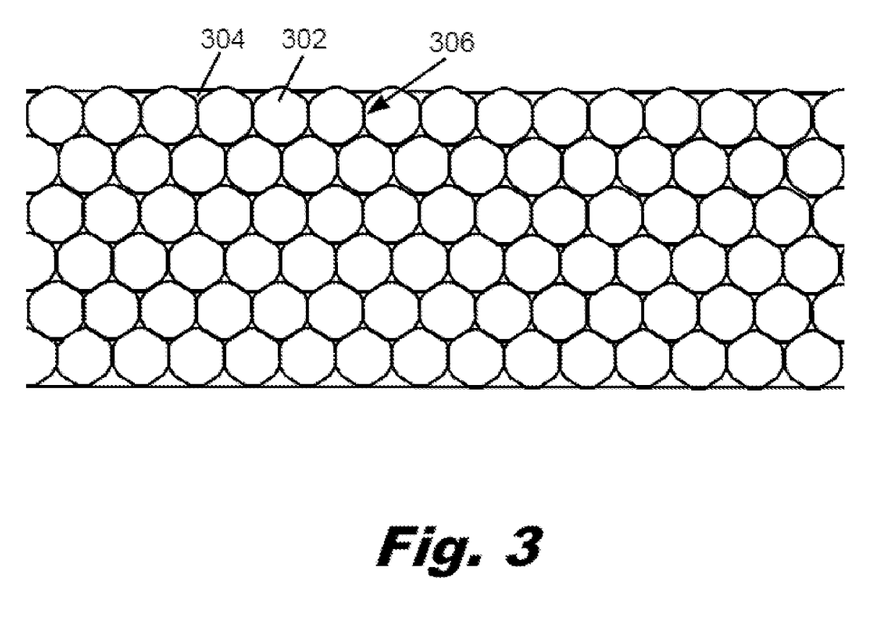
FIG. 3 is a diagram of the object of FIG. 2, after sintering, consistent with the disclosed implementations.

FIG. 3 is a diagram of the object of FIG. 2, after sintering, consistent with the disclosed implementations. FIG. 3 illustrates the build material (302) after sintering, surrounded by the sintered solid particles delivered with the liquid (304). After sintering, the build material (302) adopts a slightly different shape, and the contact surface area of the interface (306) between build material particles increases. In another example, the build material (302) particles fuse together during sintering. In a further example, the build material particles do not change in shape during sintering, but interact with components of the liquid (204) such that the sintered solid particles delivered with the liquid (304) hold the object in a stable shape after sintering.

As in FIG. 2, the build material (302) particles at the edges of in FIG. 3 are partially illustrated, and extend beyond the edges of FIG. 3. While FIGS. 2 and 3 illustrate hexagonal packing, any suitable packing, including irregular packing, may also be used in forming an object consistent with the disclosed implementations.

Figure 4:
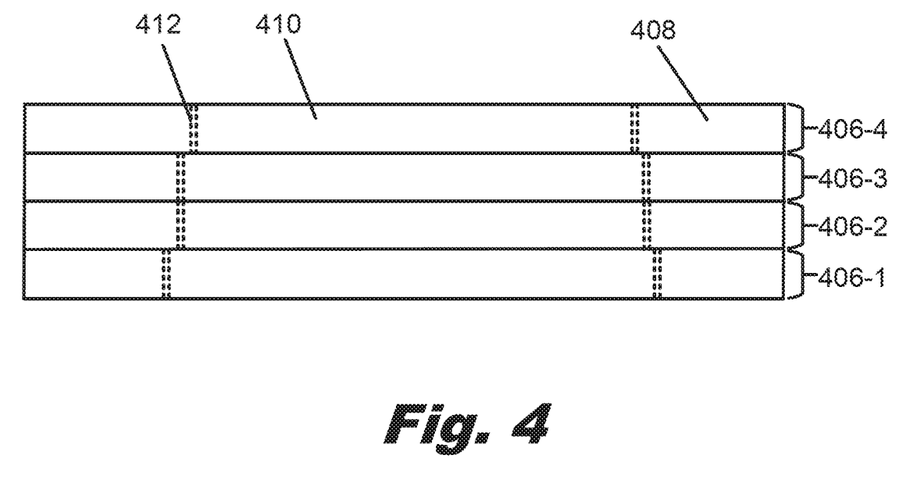
FIG. 4 is a cross-sectional diagram of an example object produced by an additive manufacturing device, consistent with the disclosed implementations.

FIG. 4 is a cross-sectional diagram of an example object produced by an additive manufacturing device, consistent with the disclosed implementations. The object illustrated in FIG. 4 includes four layers (406-1, 406-2, 406-3, 406-4). Each layer (406-1, 406-2, 406-3, 406-4) includes a free flowing region (408) onto which a liquid (204) was not dispensed. In one example, the build material (202) in the free flowing region (408) is retained to provide structural support during sintering. In another example, the build material (202) in the free flowing region (408) is removed prior to sintering. Each layer (406-1, 406-2, 406-3, 406-4) also includes an interior region (410) onto which a liquid (204) including a susceptor was dispensed. The interior region (410) coalesces into the object upon sintering. Each layer (406-1, 406-2, 406-3, 406-4) also includes an edge region (412), onto which a second liquid including a detailing agent was dispensed; the edge region (412) is enclosed with dashed lines.

A liquid including a detailing agent may be similar to, or different from, a liquid including a susceptor, and is formulated to create a well-defined edge upon sintering. An edge region (412) is provided so that the edge of an object prepared by additive manufacturing is well-defined and a liquid (204/304) including a susceptor does not bleed into a free flowing region (408) during selective deposition of the liquid (204) onto the powdered build material (202). In an example, an edge region is provided for some of the edges of an object; in another example, an edge region (412) is provided for an interior edge of an object.

According to one example, a liquid including a detailing agent uses a detailing agent that is removed upon sintering, such that the edge region (412) becomes part of the free flowing region (408) upon sintering. In another example, a liquid including a detailing agent uses a detailing agent that includes a susceptor or a sintering aid, such that the edge region (412) becomes part of the object upon sintering. In a further example, a liquid including a detailing agent uses a detailing agent that produces a special optical effect, or that contains a dye or pigment, or that contains additional components, so as to create either an optical or a physical barrier between the exterior of an object and the interior region (410) of an object.

Figure 5:
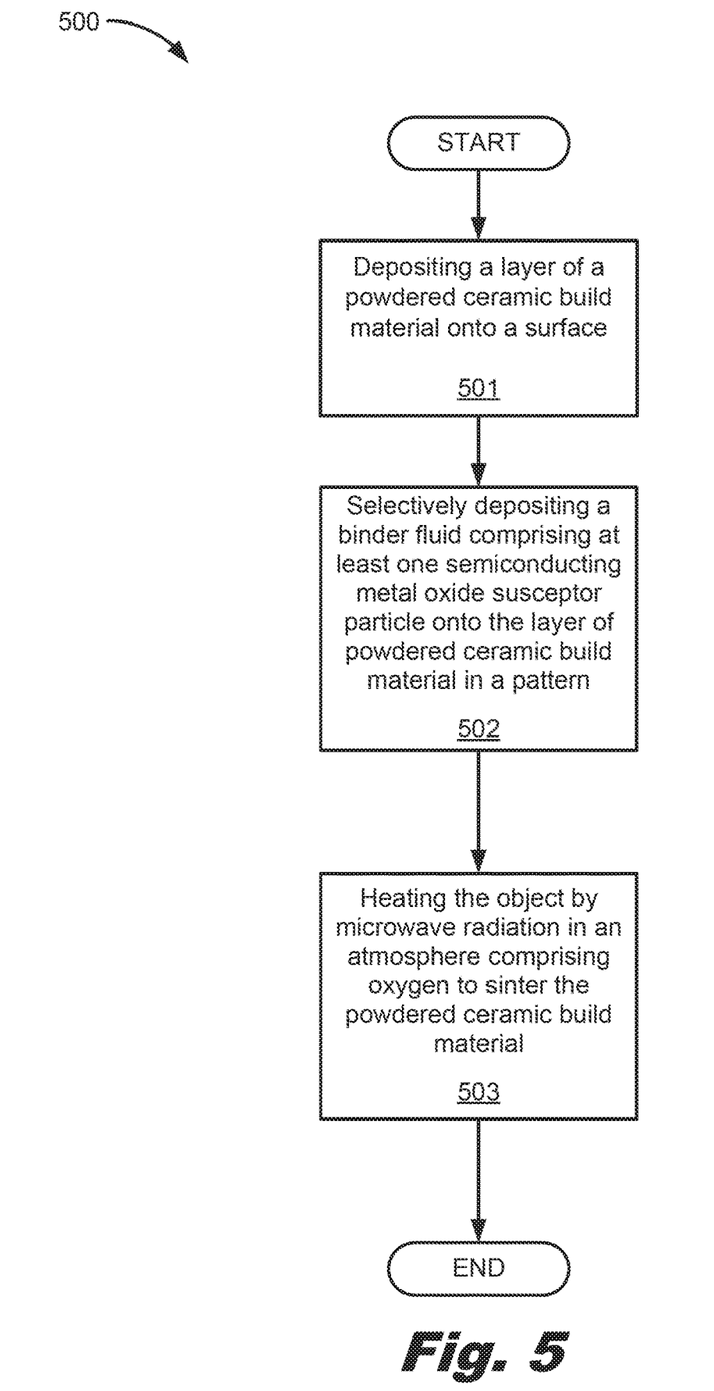
FIG. 5 is a flowchart of an example of a method for an additive manufacturing process to produce a ceramic object by sintering in an atmosphere including oxygen, consistent with the disclosed implementations.

FIG. 5 is a flowchart of an example of a method for an additive manufacturing process to produce a ceramic object by sintering in an atmosphere including oxygen, consistent with the disclosed implementations. The method (500) includes depositing (501) a layer of a powdered ceramic build material onto a surface, selectively depositing (502) a binder fluid including at least one semiconducting metal oxide susceptor particle onto the layer of powdered ceramic build material in a pattern, and heating (503) the object by microwave radiation in an atmosphere including oxygen to sinter the powdered ceramic build material.

The method (500) includes depositing (501) a powdered ceramic build material onto a surface. The surface may be any suitable surface, such as a surface on a platform on which the object is formed, or another layer of the object. Suitable ceramic build materials are noted above.

As noted above, the method (500) includes selectively depositing (502) a binder fluid that includes at least one semiconducting metal oxide susceptor particle. Semiconducting metal oxide particles are described above as suitable susceptors. For the purposes of the present specification, a semiconducting metal oxide particle is a particle that includes a metal oxide, and that is capable of acting as a semiconductor. That is, a semiconducting metal oxide particle is a particle that contains a metal oxide, and has the ability to conduct electricity, but provides an electrical conductivity between that of an insulator and a conductive metal. Non-limiting examples of suitable semiconducting metal oxide particles include copper(II) oxide particles, copper(I) oxide particles, cobalt(II) oxide particles, zinc oxide, iron(II) oxide, some ferrites, and combinations thereof.

In one example of the method (500), a binder fluid that is selectively deposited (502) onto a layer of a powdered build material also includes a number of additional susceptors. Non-limiting examples of such additional susceptors include electrically conductive, semi-conductive, and polarizable allotropes of carbon, another semiconducting metal oxide particle, silicon carbide, and combinations thereof.

In the method (500), a binder fluid including at least one semiconducting metal oxide particle may also include additional components noted above for a liquid. Such additional components include a sintering aid, a solvent, a surfactant, a dye, a pigment, and combinations thereof. A binder fluid including at least one semiconducting metal oxide particle may also include any other component known to an individual skilled in the art for such binder fluids.

According to one example, after the binder fluid has been selectively deposited (502), another layer is added by depositing (501) a layer of a powdered ceramic build material, followed by selectively depositing (502) a binder fluid. In another example, the object is heated (503) in an atmosphere including oxygen after the binder fluid has been selectively deposited (502). Heating (503) may occur at any suitable time of frequency. In one example, the object is heated (503) after each layer. In another example, the object is heated (503) after every tenth layer. In a further example, the object is heated (503) as a green body, after each layer has been added.

As noted above, the method (500) includes heating (503) the object by microwave radiation in an atmosphere including oxygen to sinter the powdered ceramic build material. Microwave radiation interacts with a semiconducting metal oxide susceptor particle within the object to heat the object; such a susceptor particle is included in the binder fluid. Heating (503) occurs in an atmosphere including oxygen, such as air.

The method (500) may also include heat that is applied between deposition of layers. The application of heat between depositing a layer and depositing the next layer may fully or partially sinter the build material and the solid particles delivered with the binder fluid, or fully or partially solidify the liquid without sintering.

The present specification is also directed to a liquid composition for use as a binder fluid in additive manufacturing. A liquid composition for use as a binder fluid in additive manufacturing contains a number of susceptors, including a semiconducting metal oxide particle. A liquid composition for use as a binder fluid in additive manufacturing also contains a number of sintering aids. A number of susceptors including a semiconducting metal oxide particle and a number of sintering aids are held in a stable dispersion in a liquid composition for use as a binder fluid.

Figure 6:
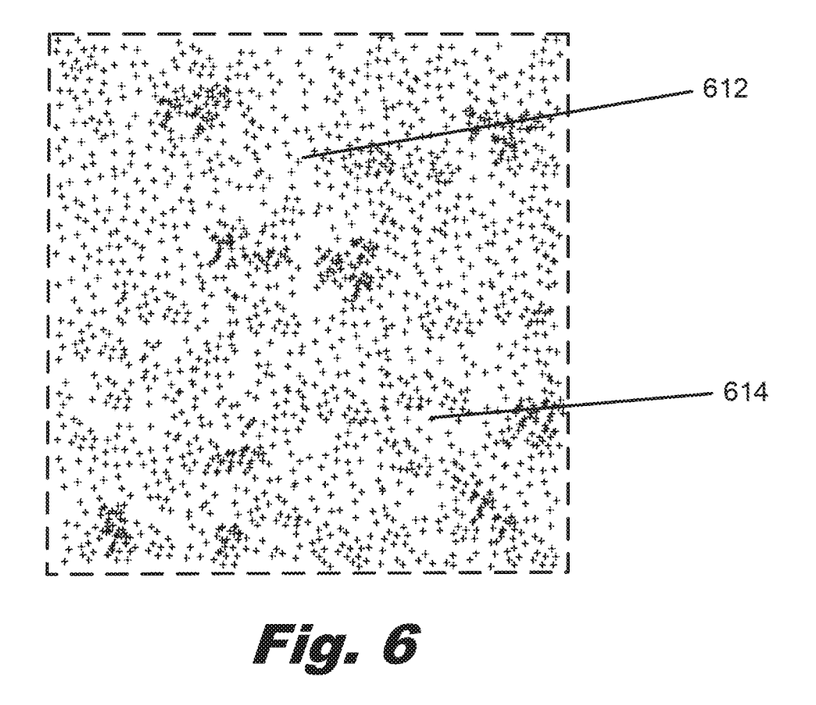
FIG. 6 is a diagram of an example liquid that includes a number of susceptors and a number of sintering aids held in a stable dispersion, consistent with the disclosed implementations.

FIG. 6 is a diagram of an example liquid that includes a number of susceptors and a number of sintering aids held in a stable dispersion, consistent with the disclosed implementations. The outer boundary of FIG. 6 is enclosed by a dashed line; a liquid may continue beyond the region shown in FIG. 6. The liquid of FIG. 6 includes a susceptor (612) that includes a semiconducting metal oxide particle. The liquid of FIG. 6 also includes a sintering aid (614). The susceptor (612) particles and the sintering aid (614) particles shown in FIG. 6 are held in a stable dispersion.

In one example, a liquid composition for use as a binder fluid contains copper(II) oxide particles as a semiconducting metal oxide particle susceptor (612). In another example, a liquid composition for use as a binder fluid contains cobalt (II) oxide particles as a semiconducting metal oxide particle susceptor (612). In a further example, a liquid composition for use as a binder fluid contains both copper(II) oxide and cobalt(II) oxide as semiconducting metal oxide particle susceptors (612).

In another example, a liquid composition for use as a binder fluid also contains additional susceptors, such as an electrically conductive, semi-conductive, and polarizable allotrope of carbon, silicon carbide, or combinations thereof.

In an example, a liquid composition for use as a binder fluid contains a sintering aid (614) selected from particles of ceramic materials. Particles of ceramic materials have a size corresponding to the diameter of the smallest sphere that could enclose the particle. According to one example, particles of ceramic materials for use as a sintering aid have a size of less than 1 micrometer (μm), such as less than 100 nanometers (nm), or less than 50 nanometers. In a further example, particles of ceramic materials for use as a sintering aid (614) have a size of less than 10 nm, such as less than 5 nm or less than 1 nm.

Non-limiting examples of ceramic materials that may be used as a sintering aid (614) in a liquid composition for use as a binder fluid include aluminum oxide ($Al_2O_3$), yttrium oxide ($Y_2O_3$), beryllium oxide (BeO), cerium oxide ($CeO_2$), zirconium oxide ($ZrO_2$), silicon nitride ($Si_3N_4$), boron nitride (BN), aluminum nitride (AlN), aluminum titanate ($Al_2TiO_5$), barium titanate ($BaTiO_3$), spinel ($MgO.Al_2O_3$), silica ($SiO_2$), magnesia (MgO), fluorite ($CaF_2$), lithium fluoride (LiF), titanium dioxide ($TiO_2$), hydroxyapatite, calcium oxide, and combinations thereof. Additional non-limiting examples of suitable sintering aids include those listed above as suitable build materials, but may also include materials that act also as susceptors.

A liquid composition for use as a binder fluid for additive manufacturing is able to be used for the preparation of three-dimensional objects by additive manufacturing that are sintered in an atmosphere including oxygen. In one example, sintering in an atmosphere including oxygen is accomplished using electromagnetic radiation with a frequency in the microwave or radio wave regions. In another example, sintering in an atmosphere including oxygen is accomplished using radiative heating, convection heating, laser sintering, or other methods known to an individual skilled in the art.

According to one example, a liquid composition for use as a binder fluid for additive manufacturing includes copper(II) oxide as a semiconducting metal oxide susceptor particle, and also includes an electrically conductive, semi-conductive, and polarizable allotrope of carbon as a supplemental susceptor particle, as well as including silica as a sintering aid. In another example, a liquid composition for use as a binder fluid for additive manufacturing includes copper(I) oxide as a semiconducting metal oxide susceptor particle, and also includes zirconium oxide as a sintering aid.

EXAMPLES

Example 1

Aluminum oxide ($Al_2O_3$) was used as the build material. The liquid was prepared so that the object would contain approximately 4.0% by weight of copper(II) oxide (CuO), 1.7% by weight of carbon black, and 7.0% by weight of silica ($SiO_2$). The copper oxide and carbon black were provided as susceptors, and the silica was provided as a sintering aid. A three-dimensional object was prepared according to the method of FIG. 1; sintering was performed in air in a 2.1 kilowatt (kW) microwave. To facilitate high temperature sintering with minimal microwave power, external silicon carbide (SiC) rods were provided.

The rate of heating achieved by the copper(II) oxide is graphed in FIG. 7, discussed further below. At temperatures above approximately 500 degrees Celsius, carbon black reacts with oxygen in air to form carbon oxides. After sintering, carbon black is no longer present in the object, and the amount of copper(II) oxide and silica remained unchanged from their levels prior to sintering.

Example 2

Aluminum oxide ($Al_2O_3$) was used as the build material. The liquid was prepared so that the object would contain approximately 9.0% by weight of ferrite, 1.7% by weight of carbon black, and 7.0% by weight of silica ($SiO_2$). The ferrite and carbon black were provided as susceptors, and the silica was provided as a sintering aid. A three-dimensional object was prepared according to the method of FIG. 1; sintering was performed in air in a 2.1 kW microwave. To facilitate high temperature sintering with minimal microwave power, external silicon carbide (SiC) rods were provided.

The rate of heating achieved by the ferrite is graphed in FIG. 7, discussed further below. As in Example 1, the carbon black is no longer present in the object after heating to temperatures above about 500 degrees Celsius, and the amount of silica and ferrite remain unchanged from their levels prior to sintering.

Examples 1 and 2 are compared in Table 1, which provides the relative amount of each component of the liquid, both before and after sintering. All amounts are percentages by weight, relative to the total weight of the object.

TABLE 1

| Component | Example 1 | | Example 2 | |
| --- | --- | --- | --- | --- |
| | Before Sintering | After Sintering | Before Sintering | After Sintering |
| Carbon Black | 1.7 | 0 | 1.7 | 0 |
| CuO | 4.0 | 4.0 | — | — |
| Ferrite | — | — | 9.0 | 9.0 |
| $SiO_2$ | 7.0 | 7.0 | 7.0 | 7.0 |

Figure 7:
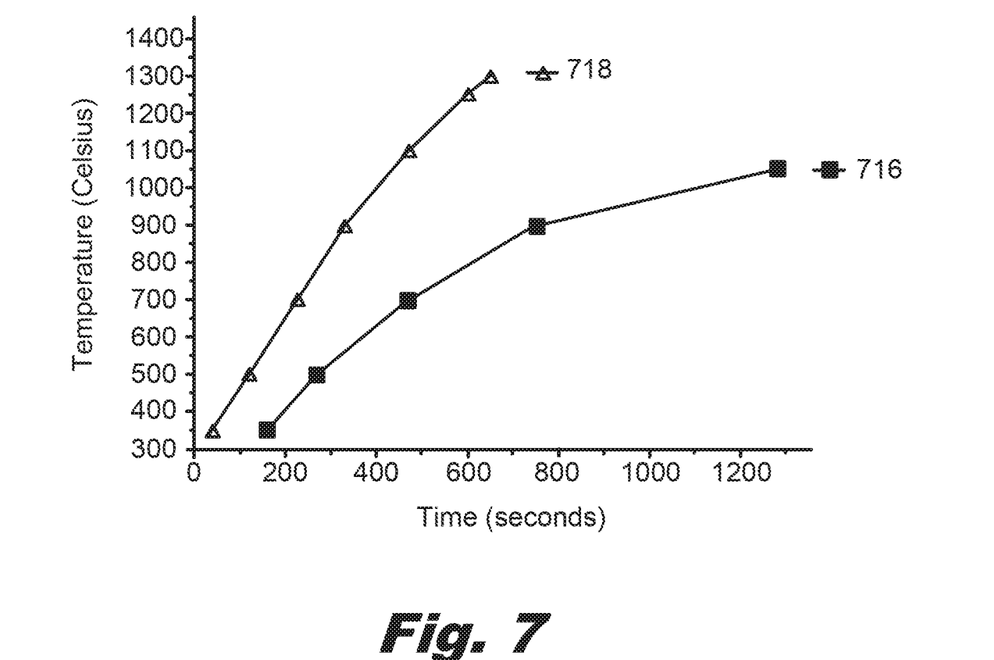
FIG. 7 is a graph comparing the efficacy of copper oxide and ferrite as susceptors, consistent with the disclosed implementations.

Examples 1 and 2 are also compared in FIG. 7. FIG. 7 is a graph comparing the efficacy of copper oxide and ferrite as susceptors, consistent with the disclosed implementations. FIG. 7 graphs the rate of temperature increase as a function of time when an object prepared in accordance with the method of FIG. 1 is exposed to microwave radiation. FIG. 7 graphs the heating rate for ferrite (716) and for copper(II) oxide (718). The heating rate for copper(II) oxide corresponds to the object prepared in Example 1, and the heating rate for ferrite corresponds to the object prepared in Example 2. In some examples, ferrite (716) has been considered a highly effective susceptor. However, surprisingly, the use of copper(II) oxide (718) as a susceptor is able to reach high temperatures at faster rates than ferrite (716). Additionally, the use of copper(II) oxide (718) as a susceptor is able to reach temperatures that are not achievable with the use of ferrite (716) as a susceptor. The rapid heating for copper(II) oxide in FIG. 7 provides that sintering of a ceramic object at temperatures up to 1300 degrees Celsius can be achieved much more rapidly.

It may also be noted that in Example 1, the copper(II) oxide was involved in a solid-state reaction with the aluminum oxide build material, and generated a turquoise pigment, which was observable on the surface of the object produced. Additionally, despite the use of the silicon carbide rods to boost the microwave performance, the temperature in Example 2 did not reach the fusing temperature of approximately 1300 degrees Celsius for the aluminum oxide build material.

While the present disclosure has provided a number of examples, it is contemplated that the devices and methods disclosed herein may prove useful in addressing other matters and deficiencies in a number of technical areas. Therefore, the systems and methods disclosed herein should not be construed as addressing any of the particular matters.

The preceding description has been presented to illustrate and describe examples of the principles described. This description is not intended to be exhaustive or to limit these principles to any precise form disclosed. Many modifications and variations are possible in light of the above teaching.

What is claimed is:
1. A method for additive manufacturing, comprising:
   forming a three-dimensional object by:
      depositing a layer of a powdered build material onto a surface;

selectively depositing, by jetting, a liquid comprising a first susceptor and a second susceptor onto the layer of the powdered build material in a pattern, wherein the first susceptor comprises an allotrope of carbon to be removed from the object by oxidation by heating the object by electromagnetic radiation such that at least a portion of the object reaches a temperature of at least 600 degrees Celsius in an atmosphere comprising oxygen, wherein the allotrope of carbon is selected from the group consisting of: an electrically conductive allotrope of carbon, a semiconductive allotrope of carbon, and polarizable allotrope of carbon; and heating the at least a portion of the object by electromagnetic radiation with a microwave or radio wave frequency, in the atmosphere comprising oxygen, to the temperature of at least 600 degrees Celsius sufficient to sinter the powdered build material and to remove the allotrope of carbon from the object by oxidation.

2. The method of claim 1, wherein the powdered build material comprises a compound selected from:
 a. oxides containing at least one of silicon, aluminum, beryllium, barium, cerium, magnesium, titanium, hafnium, tin, zirconium, and yttrium;
 b. nitrides containing at least one of aluminum, boron, and silicon;
 c. fluorides containing at least one of aluminum, lithium, magnesium, and calcium; and
 d. combinations thereof.

3. The method of claim 1, wherein the powdered build material comprises a compound selected from homopolymers, copolymers, and composites of a polymer with glass, ceramic or carbon, comprising a polymer that is selected from a polyimide, a polyamide-imide, a nylon, a polyvinyl chloride, a polycarbonate, a high-density polyethylene, a fluorinated polyethylene, a polypropylene, a fluorinated polypropylene, a polyaryletherketone, a polybenzimidazole, and acrylonitrile-butadiene-styrene.

4. The method of claim 1, wherein the liquid comprising the first susceptor and the second susceptor further comprises a sintering aid, present in an amount ranging from 0.1% to 20% by weight relative to a total weight of the liquid, the sintering aid selected from nanoparticles of aluminum oxide, nanoparticles of zirconium oxide, nanoparticles of beryllium oxide, and nanoparticles of silica, wherein the sintering aid includes nanoparticles that have a glass transition or melting temperature below or near a glass transition temperature of build material particles, and wherein, upon heating, the sintering aid nanoparticles mediate the fusing of the build material particles to sinter the object, and are sintered to and around the build material particles.

5. The method of claim 1, wherein the second susceptor comprises copper(I) oxide.

6. The method of claim 1, wherein the liquid comprising the first susceptor and the second susceptor is a stable dispersion prior to the jetting, and wherein the liquid comprising the first susceptor and the second susceptor is to sustain an increase in pressure associated with the jetting without perturbing the stability of the dispersion.

7. The method of claim 1, wherein forming the three-dimensional object further comprises selectively depositing a second liquid comprising a detailing agent around an exterior surface of a layer of the object to define an edge upon sintering by creating an optical or a physical barrier between the exterior surface of the layer of the object and an interior region of the layer of the object.

8. An additive manufacturing method for preparing a three-dimensional ceramic object, comprising:
 forming a three-dimensional object by:
  depositing a layer of a powdered ceramic build material onto a surface;
  selectively depositing a binder fluid comprising at least one semiconducting metal oxide susceptor particle onto the layer of powdered ceramic build material in a pattern, wherein the at least one semiconducting metal oxide is selected from the group consisting of copper(I) oxide, cobalt(II) oxide, and zinc oxide; and
  heating at least a portion of the object by microwave radiation in an atmosphere comprising oxygen to a temperature of at least 800 degrees Celsius to sinter the powdered ceramic build material.

9. The method of claim 8, wherein the ceramic build material comprises a material selected from:
 a. oxides containing at least one of silicon, aluminum, beryllium, barium, cerium, magnesium, titanium, hafnium, tin, zirconium, and yttrium;
 b. nitrides containing at least one of aluminum, boron, and silicon;
 c. fluorides containing at least one of aluminum, lithium, magnesium, and calcium; and
 d. combinations thereof.

10. The method of claim 8, wherein the binder fluid further comprises a second susceptor that comprises a semiconductive, or polarizable allotrope of carbon.

11. The method of claim 1, wherein the second susceptor comprises cobalt(II) oxide or zinc oxide.

12. The method of claim 9 wherein the temperature of at least 800 degrees Celsius is at least 1000 degrees Celsius.

* * * * *